United States Patent [19]

Schier

[11] Patent Number: 5,590,059

[45] Date of Patent: Dec. 31, 1996

[54] POSITION ENCODER SYSTEM WHICH UTILITES THE FUNDAMENTAL FREQUENCY OF A RULED SCALE ON AN OBJECT

[76] Inventor: J. Alan Schier, 7105 Owens St., Tujunga, Calif. 91042-1425

[21] Appl. No.: 403,409

[22] Filed: Mar. 14, 1995

[51] Int. Cl.$^6$ ................................................. G05B 19/18
[52] U.S. Cl. ..................... 364/559; 364/167.01
[58] Field of Search .................... 364/559, 167.01, 364/560, 561, 562; 33/763; 356/388–398; 250/237 R, 237 G, 231.16

[56] References Cited

U.S. PATENT DOCUMENTS

| | | | |
|---|---|---|---|
| 4,157,489 | 6/1979 | Tal | 318/606 |
| 4,360,730 | 11/1982 | Breslow | 340/347 P |
| 4,414,754 | 11/1983 | Lapeyre | 33/363 K |
| 4,439,672 | 3/1984 | Salaman | 235/463 |
| 4,445,110 | 4/1984 | Breslow | 340/347 P |
| 4,462,083 | 7/1984 | Schwefel | 364/577 |
| 4,468,745 | 8/1984 | Kjosavik | 364/559 |
| 4,572,952 | 2/1986 | March | 340/347 P |
| 4,594,579 | 6/1986 | Schmitt et al. | 340/347 S Y |
| 4,595,991 | 6/1986 | Spies | 364/525 |
| 4,602,436 | 7/1986 | Ernst | 33/125 C |
| 4,606,008 | 8/1986 | Wason | 364/560 |
| 4,618,940 | 10/1986 | Schmitt | 364/560 |
| 4,682,091 | 7/1987 | Krewalk et al. | 318/685 |
| 4,764,881 | 8/1988 | Gagnon | 364/559 |
| 4,843,292 | 6/1989 | Ono et al. | 318/606 |
| 4,884,226 | 11/1989 | Sakano | 364/560 |
| 5,220,498 | 6/1993 | Ohsawa et al. | 364/167.01 |
| 5,254,919 | 10/1983 | Bridges et al. | 318/560 |
| 5,302,821 | 4/1994 | Igaki et al. | 250/237 G |
| 5,305,241 | 4/1994 | Hayashi | 364/576 |
| 5,319,577 | 6/1994 | Lee | 364/539 |

*Primary Examiner*—James P. Trammell
*Attorney, Agent, or Firm*—Cislo & Thohmas

[57] ABSTRACT

A position encoder system is disclosed for determining the position of an object. The system includes a camera, a ruled scale, and a control system. The system first obtains a pixel brightness image of the ruled scale attached to the object and downloads this data image to a computer. The computer, running a fast position determination, determines the fundamental frequency of the image through the use of a Fourier transform of the pixel brightness variations in the image. The phase difference between the fundamental frequency and a reference is then converted into an actual position of the object since the spacing of the individual rulings on the scale is known and one cycle of the fundamental frequency corresponds to one spacing interval on the rulings. With this measurement of the actual position, the control system compares it to the desired position and, if necessary, corrects the position of the object.

33 Claims, 9 Drawing Sheets

POSITION ENCODER SYSTEM WHICH UTILITES THE FUNDAMENTAL FREQUENCY OF A RULED SCALE ON AN OBJECT

FIELD OF THE INVENTION

The present invention relates to a position encoder and, more particularly, to a novel encoder that uses a camera, a ruled scale, and an image processing method that uses phase differences to determine the actual position of an object.

BACKGROUND

Position encoders are commonly used to determine the linear or angular displacement of an object. One of many applications requiring high precision is telescope axis encoding. In telescopes of large size such as those utilized by observatories, telescope axis encoding is a significant problem due to the fine resolution desired and large dynamic range of measurement. Generally, such telescopes are mounted on a large disk or base rotatable about a vertical axis. The mounting of the telescope on the disk is such that the telescope is rotatable about a horizontal axis for altitude positioning. The axis encoding problem manifests itself, for example, when an astronomer is following a star in the sky and attempts to move the large telescope to track the movement of the star using a control system and a mechanical drive mechanism. If the telescope is moved slightly out of range, the star may move out of the field of view of the telescope and may not be seen. The problem is how to determine the actual movement of the telescope as produced by the mechanical drivers and whether that movement is in accordance with the desired movement necessary for proper tracking of the star as calculated by the control system.

There are several existing encoders that incorporate different methods for measuring the actual displacement of an object. However, all suffer from various problems that make them undesirable, particularly for applications that require high precision. A common device for position measurement is a friction driven encoder in which a rotary encoder is coupled to a capstan. The capstan is then driven by a large diameter surface to achieve the desired position, or angular resolution. These devices can be serviceable; however, they involve difficult mechanical tolerances due to roller slippage and other problems and are dirt sensitive.

Another alternative utilized to measure the displacement of the telescope is a tape encoder. One tape encoder, produced by Heidenhain, uses a read head for reading patterns on a tape coupled to the base of the telescope. The tape patterns are light and dark lines spaced apart at approximately 100 microns. The patterns move along the head, whereby the head determines displacement based on the read patterns. The problem with this tape encoder is that it is dirt sensitive and has difficult alignment tolerances. Another tape encoder, produced by Farrand, is an inductive tape encoder in which the head abuts the tape. The Farrand tape has a copper trace pattern through which an ac signal is passed. The head picks up a magnetic field caused by the current in the copper trace and measures offset based on magnetic field strength. The inherent problem with this system is that the electrical and magnetic fields are affected by electrical interference from other wires or machinery in the room. This may introduce unacceptable error. These tape encoders also involve difficult mechanical and electrical details, can be dirt sensitive, and can be rather expensive.

Other applications use glass scale encoders in which a reflective pattern is put on glass. One example of such an encoder, produced by Sony and Cannon, is called a holoscale. Finely spaced pattern lines cause diffraction that can be measured by a tracking system. Problems with these devices include sensitivity to dirt, difficult alignment tolerances, and relatively high cost compared to other available devices.

Another position encoding technique known in the art is used at the U.S. Naval Observatory at Flagstaff, Ariz.. There, a video camera images a scale attached around the circumference of the telescope base. Mathematical operations are used to locate the image in relation to a predetermined calibration point. This technique is not well suited for tracking moving objects because of the required processing time of the mathematical correlation.

Finally, another encoding system, described in Spies, U.S. Pat. No. 4,595,991, determines the position of an object through the use of scanning elements and harmonic-free periodic signals. The periodic analog signals generated by the scanning elements are subject to a Fourier analysis to determine the Fourier coefficients of the fundamental wave of the signals. The use of a Fourier analysis as part of a mathematical algorithm to determine the position of an object reduces the required processing time of the mathematical correlation. These Fourier coefficients are then evaluated as harmonic-free periodic signals for the formation of position measuring values. While this technique teaches the extraction of a frequency and finding its phase, it relies on only a relatively small number of samples. The samples are obtained using six separate scanning elements arranged in a cumbersome manner. Extending this device to use even 100 samples would be very unattractive from a practical standpoint. Furthermore, the invention is expensive to manufacture because of the close tolerances and alignments caused by its photodetector scanning element arrangement. The close mechanical tolerances and precise apertures involved in the arrangement also render the device sensitive to contamination.

Therefore, there is a need for an improved position encoder which is noncontacting, relatively less sensitive to dirt contamination and line to line spacing variations, and which has practical alignment tolerances. A desirable encoder should not involve difficult mechanical and electrical details, should not have electrical and magnetic fields which are affected by electrical interference from other wires or machinery in the room, and should be relatively low in cost compared to those in the prior art. Finally, the required processing time of any mathematical operation used should be relatively short so as to allow the device to be useful for real-time tracking of the displacement of a moving object, e.g., the moving base of a telescope.

BRIEF SUMMARY OF THE INVENTION

There is, therefore, provided in a preferred embodiment of the present invention, a position encoding system including a camera to obtain a pixel brightness image of a relatively wide continuous section of a ruled scale or other indicia on the object. The system loads the image data into a computer that determines the fundamental frequency of the pixel brightness variations corresponding to the rulings on the scale. This fundamental frequency is determined preferably, but not necessarily, by taking the Fourier transform of the pixel brightness variations in the image. The system performs an averaging function over a significant number of rulings, e.g., 200 separate rulings, dependent on pixel brightness or other parameters for detecting the rulings.

Once the fundamental frequency is computed, a sine wave is generated in the computer with the same frequency as the fundamental. The phase of the computed sine wave is then compared to the phase of the fundamental frequency from the pixel brightness variations (image) of the scale. In a preferred embodiment, both a computed sine wave and cosine wave are used. The phase difference is then converted directly into a position. This measurement of the actual position is compared to a computer-generated value of the desired position of the moving object. In the case of a telescope, for example, this might be the displacement of the base of the telescope necessary to track the movement of a star or other celestial body. Finally, a conventional control system uses the difference between the actual and desired positions to correct the position of the object.

The position encoder of the present invention effectively overcomes many of the drawbacks of the prior art position encoders while meeting the aforementioned needs. Specifically, the position encoder may be used for encoding objects that require fine precision or a fine resolution. Since the image processing method in the present invention views many individual rulings in an image sample, random variations in pixel brightness of the image caused by dirt on the ruled scale or other contamination have only a very small effect on the computed fundamental frequency used to determine the actual position of the object.

In addition, the encoder utilizes a camera and a computer and does not involve difficult mechanical or electrical details, specifically affording a low cost alternative in comparison to other position encoding devices. Furthermore, the use and effective averaging of a large number of rulings largely eliminates many of the inherent errors that can occur by using only one or several rulings and a correlation algorithm to find position. Further still, the use of the preferred phase computation method according to the present invention eliminates much of the computation time required by a mathematical correlation, and makes the system practical for tracking a moving object.

BRIEF DESCRIPTION OF THE DRAWINGS

These and other features and advantages of the present invention will become apparent by reference to the following detailed description when taken in conjunction with the following drawings in which.

DETAILED DESCRIPTION

Figure 1:
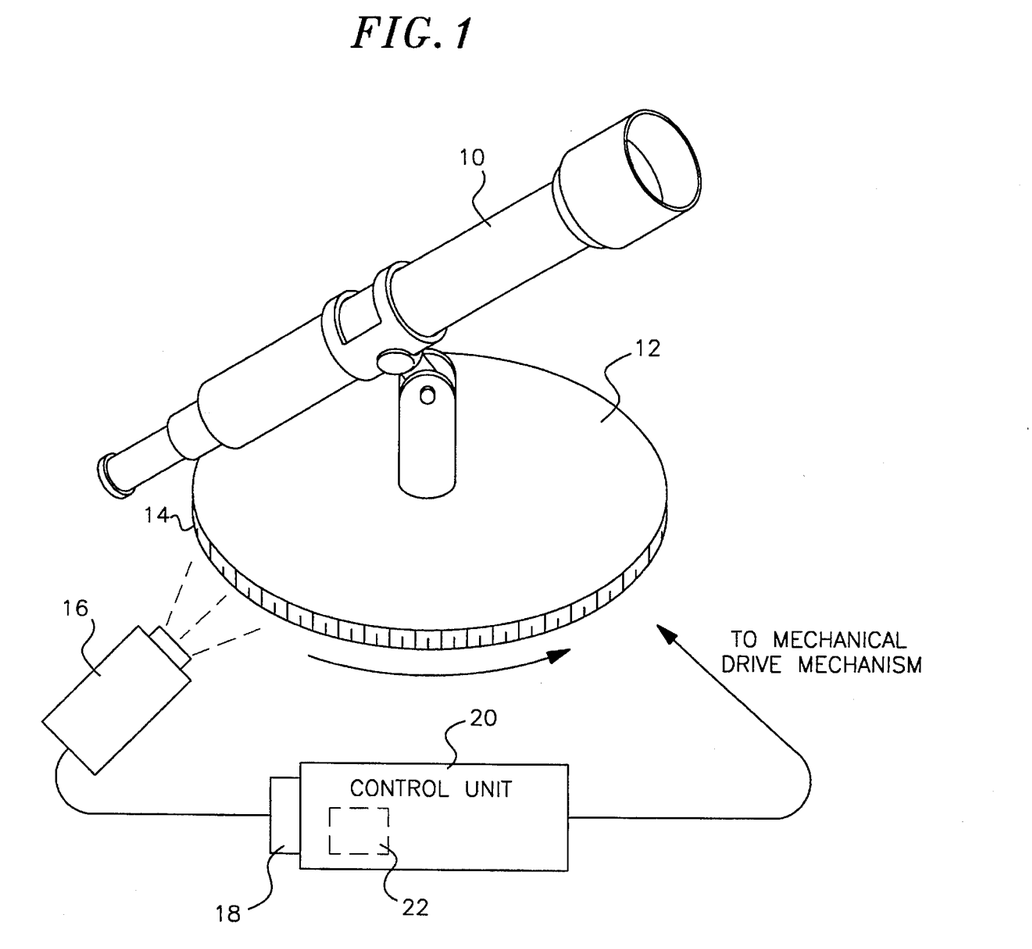
FIG. 1 is a hardware representation of an exemplary embodiment of the present invention as a telescope encoder system.
Figure 2:
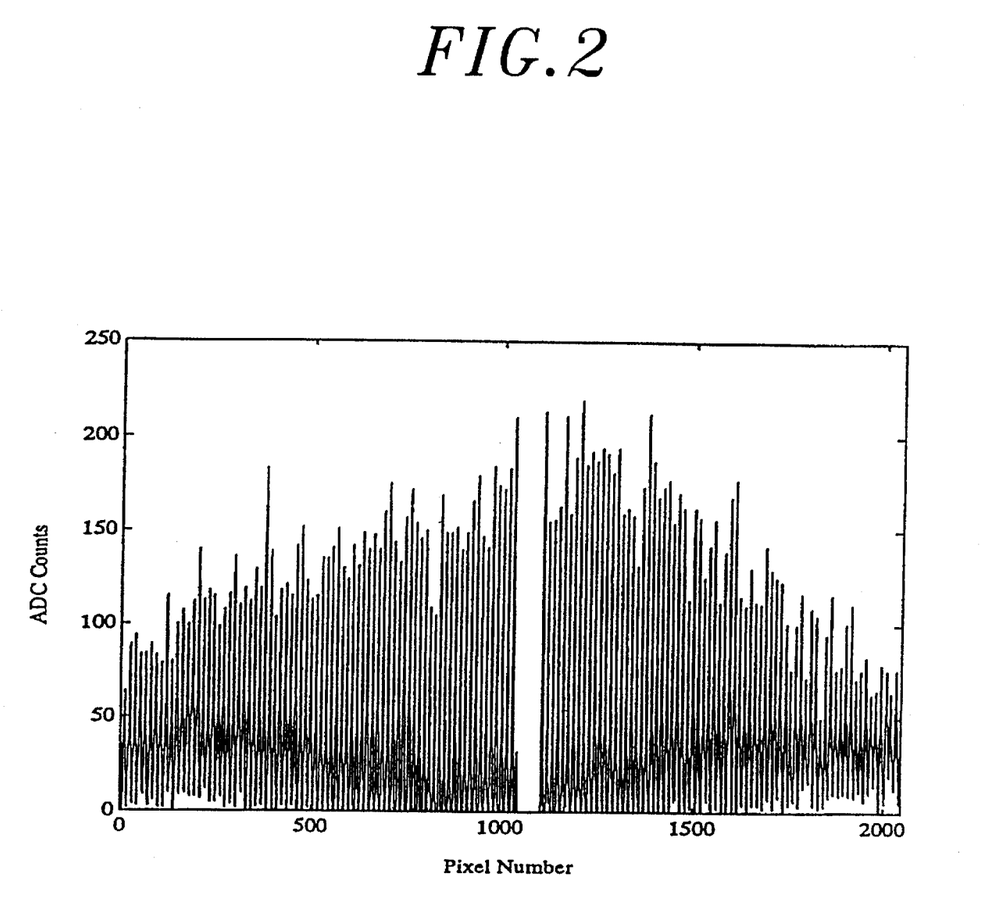
FIG. 2 is a representation of an image of the pixel brightness components, corresponding to light and dark etches on the ruled scale, which are downloaded from a camera to a control unit.

The present invention is able to determine the position of an object and to provide data that can be used to adjust its position to a desired position. Referring to FIG. 1, an exemplary embodiment of the present invention involves an observatory telescope 10. An indicating means, such as a ruled strip scale 14, is attached to the object, in this case, the rotating base 12 of the telescope. The ruled scale can be made of a variety of materials, such as steel, acetate, or paper, or can merely include markings on the object. In the case of the observatory telescope, the ruled scale is distributed along the circumference of the base and includes finely-spaced light and dark individual rulings. The rulings are focused upon by a video camera 16 or other detecting means adjacent the strip. The video camera takes a real time picture of a continuous portion of the ruled scale and downloads a representation of the scale through conventional digital signal processing techniques to a control unit 20 attached to the camera through an interface 18. Referring to FIG. 2, in a presently preferred embodiment, the representation is a pixel brightness image corresponding to light and dark etches on the ruled scale.

As a function of the pixel brightness representation, the control unit determines the actual position of the object to which the ruled scale is attached. Also within the control unit, a conventional control system program 24 computes the desired position of the telescope, e.g., the angular displacement of the base required to accurately track a star or other body being viewed. Based on the difference between the actual and desired position, the control system adjusts a conventional mechanical drive mechanism to minimize the difference.

Figure 3:
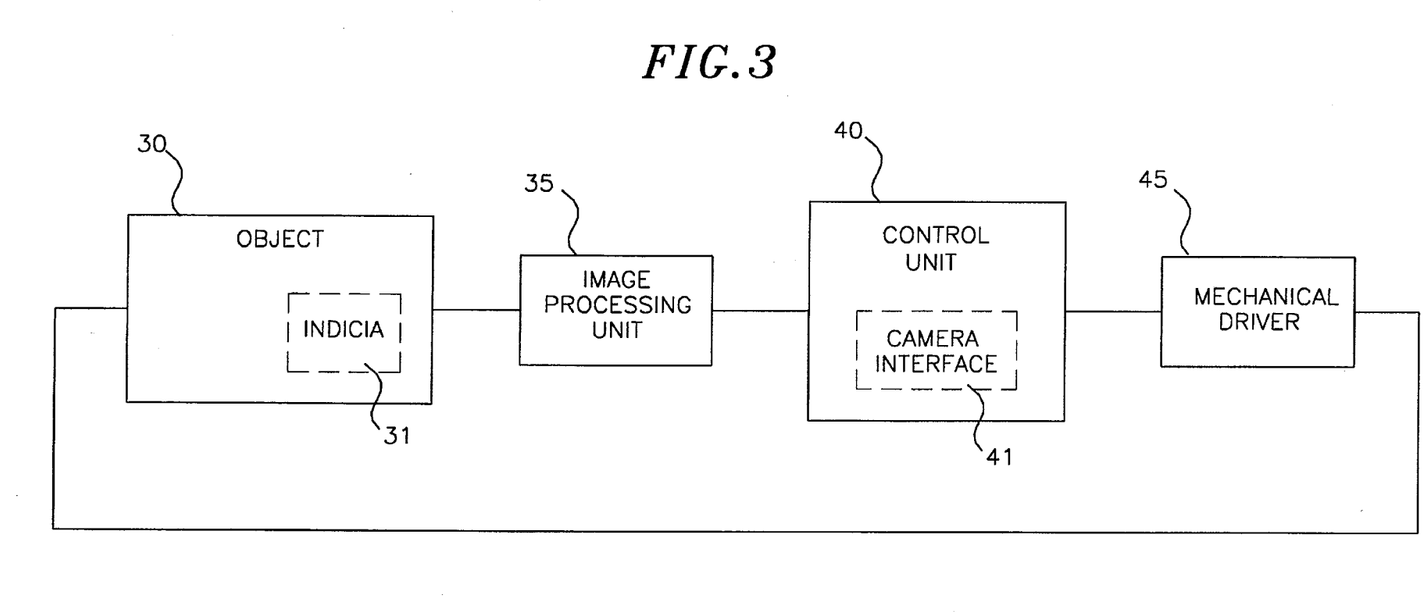
FIG. 3 is a block diagram of a position encoding apparatus for determining the position of an object.
Figure 4A:
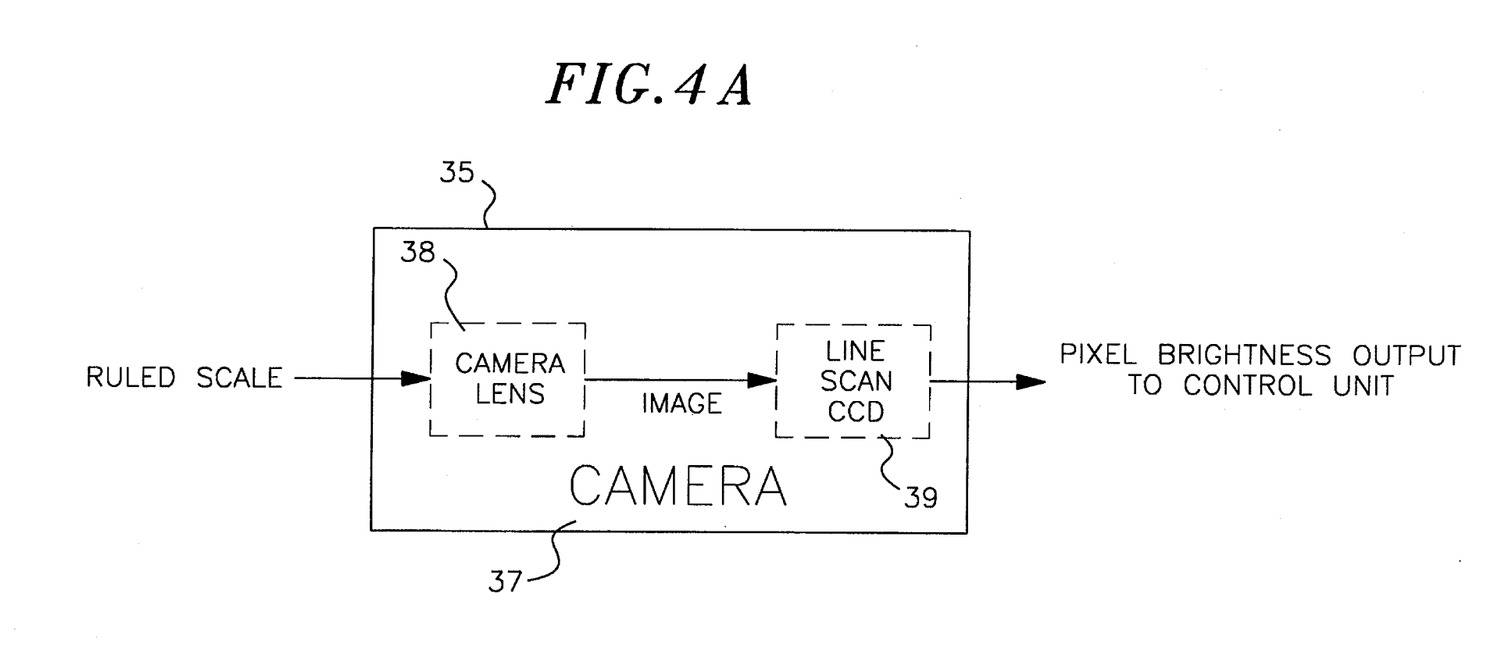
FIG. 4A is a block diagram of the image processing unit of the position encoding apparatus of FIG. 3.
Figure 4B:
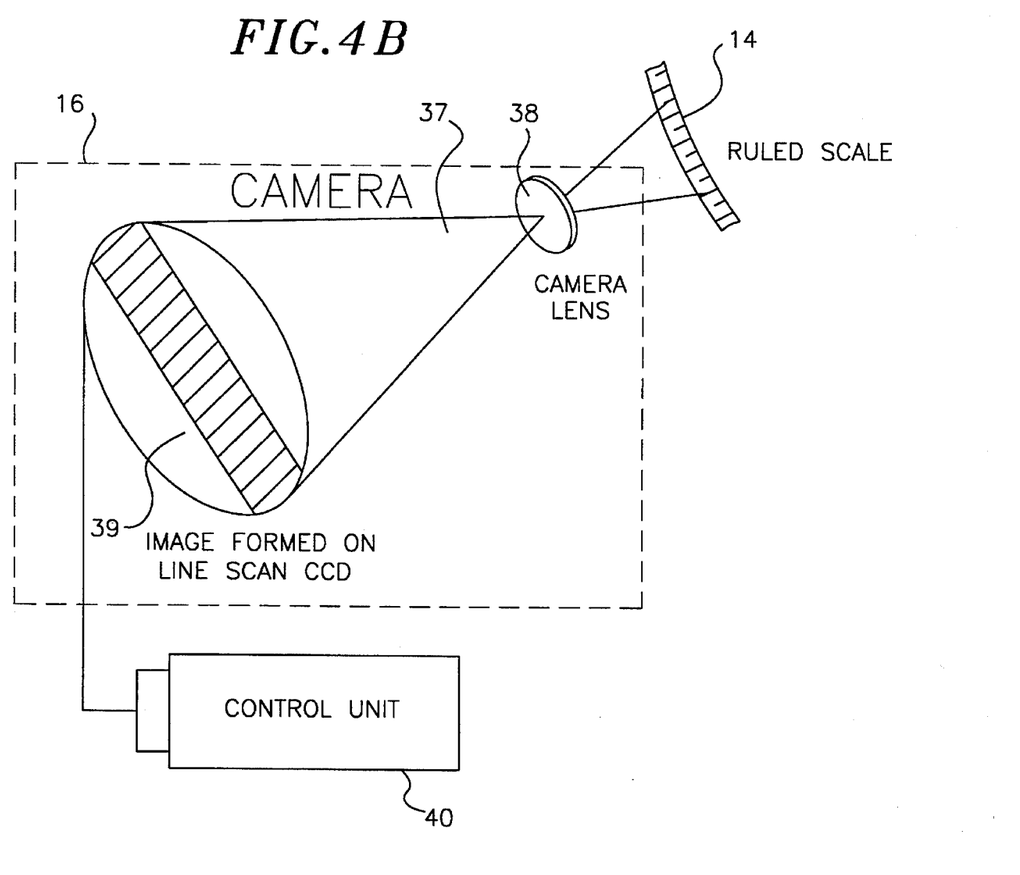
FIG. 4B is a hardware representation of the image processing unit of FIG. 3 and FIG. 4A.

Referring to FIG. 3, in a more general embodiment, an object 30 whose position is to be determined has indicia 31 coupled to its surface. A pixel brightness (data) image of the indicia is taken by a detecting means and processed in an image processing unit 35. As shown in FIGS. 4A and 4B, in a preferred embodiment the image processing unit consists of a camera 37, which utilizes a line scan charge coupled device (CCD) 39 image detector directed at a portion of the ruled scale indicia 14 on the object. The camera lens 38 reflects an image of a portion of the ruled scale on the line scan CCD which creates a pixel brightness image of the ruled scale. For best performance, the variation in standoff distance between the camera and the ruled scale should be minimized. In the case of a telescope, the easiest way to achieve this is to mount the camera near one of the bearing points that defines the axis position. The camera views a relatively wide section of the ruled scale so as to take into account a relatively high number of rulings on the scale. In the preferred embodiment, the camera will take an image of at least two hundred individual rulings.

Referring again to FIG. 3, in a preferred embodiment, the pixel brightness representation is downloaded to a control unit 40 through the use of a conventional camera interface 41 connected to the control unit. According to the present invention, the control unit determines the actual position of the object 30 to which the ruled scale is attached through the use of a position determination method that performs an averaging function of the frequency of a pattern or markings comprising the indicia and a method of determining the phase of that frequency contained in the pattern or markings. In the preferred embodiment, the frequency determined is the fundamental frequency of the pixel brightness variations.

Figure 6:
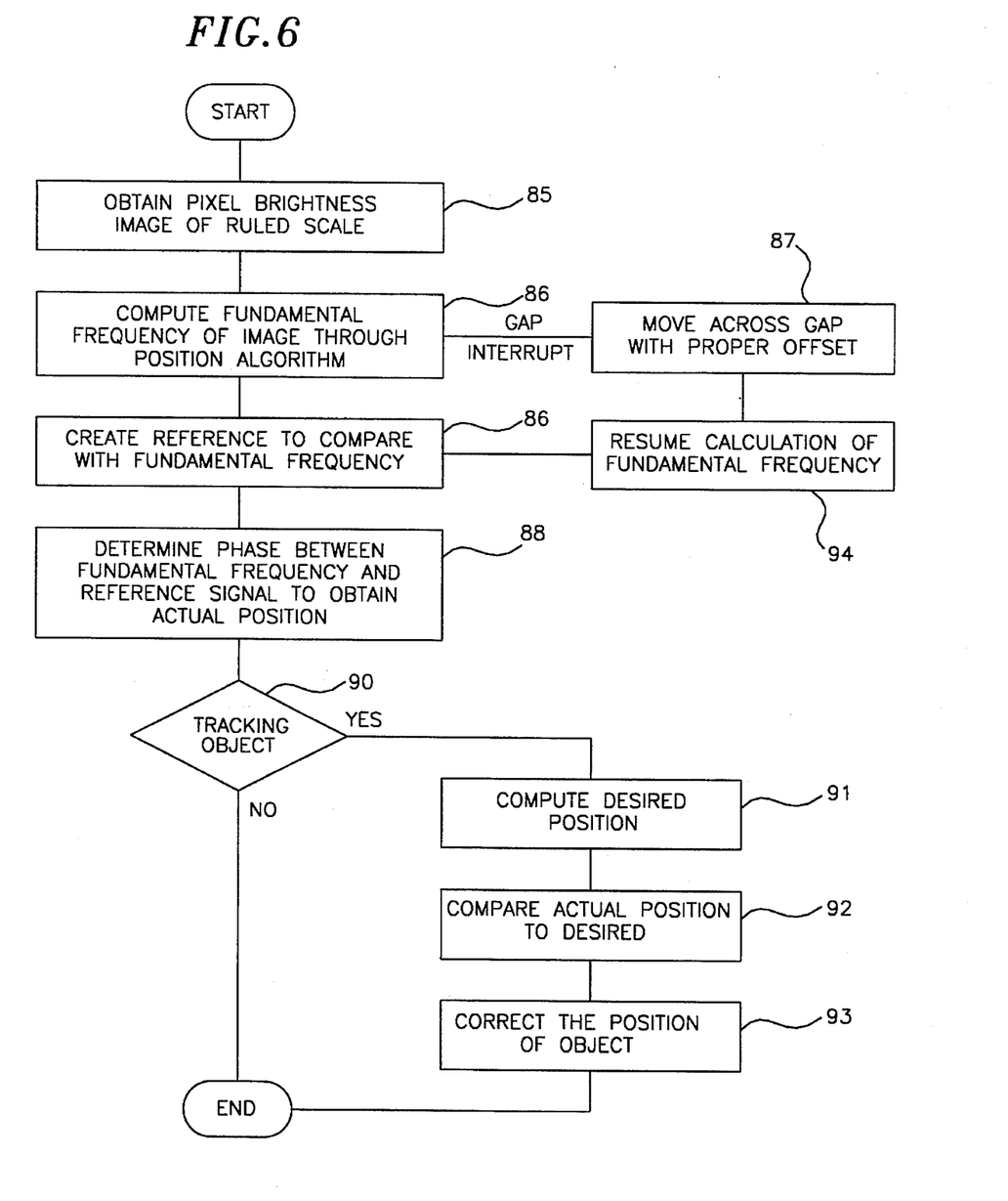
FIG. 6 is a flow diagram of the presently preferred embodiment of the position encoding method.

Referring to the flow diagram of FIG. 6, in blocks 85 and 86 the fundamental frequency is preferably, but not necessarily, determined by taking the Fourier transform of the pixel brightness variations in the image. Since the camera views many individual rulings on the scale, random variations in the pixel brightness due, for example, to dirt on the ruled scale, have only a very small effect on the computed fundamental frequency. In theory, truly random variations have no effect on the computed fundamental frequency. Furthermore, the use and effective averaging of a large number of rulings in the image eliminates many of the inherent errors that can occur by using only one or several rulings and a correlation algorithm to find their positions as is done in the prior art.

Figure 7:
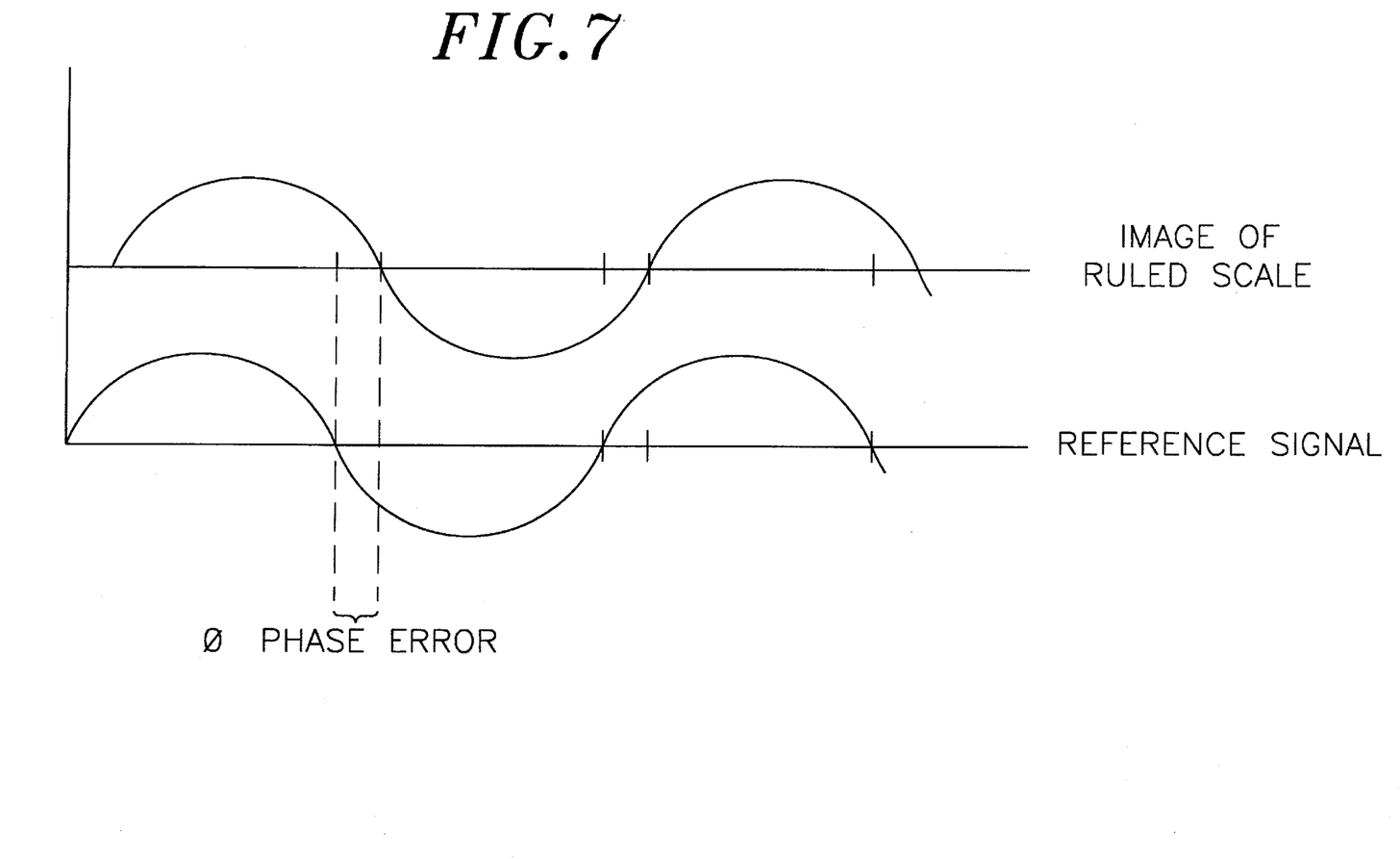
FIG. 7 is a graphical representation of the comparison of the phase of the computed sine wave to the phase of the fundamental frequency from the image of the ruled scale.

Once the fundamental frequency is computed, the phase of the fundamental contained in the pixel brightness variations is determined. This may be done in several ways. In block 88, a sine wave may be generated in the computer with the same frequency as the fundamental. Also referring to FIG. 7, the phase of this computed sine wave reference signal is then compared to the phase of the fundamental frequency from the image of the ruled scale block 89 and the phase difference noted.

In a preferred embodiment, both a computed sine wave and a computed cosine wave are generated in block 88 and are used to compute the phase difference. This is accomplished by first calculating the scalar product of the image with, in turn, the computed sine and then the computed cosine. The phase is found as the four-quadrant arctangent based on the resulting scalar magnitudes. This method is referred to as the "scalar product method", mathematically expressed as follows:

First, $$M_s = S(n) \bullet I(n);$$

and $$M_c(n) \bullet I(n);$$

then $$P = A\tan2(M_c, M_s);$$

where

I(n) is the pixel brightness data from the camera;

S(n) and C(n) are the computed sine and cosine functions;

"●" is the scalar product operation (also known as the dot product operator);

$M_s$ and $M_c$ are the scalar magnitudes that result from forming the scalar product of S(n) and C(n), respectively, with I(n);

Atan2() is the four-quadrant arctangent function; and

P is the phase of the fundamental frequency contained in I(n).

As an example, suppose that the fundamental contained in I(n) has a phase of zero (i.e., coincident with the sine function). In that case, $M_c$ will compute to zero and Atan2(0, $M_s$) will also compute to 0, which is the correct phase. As a second example, suppose that the fundamental contained in I(n) has a phase of 135°. In this case, $M_s$ computes to a value, call it m, and $M_c$ will compute to a value with the same magnitude as m but opposite sign, −m. In this case, Atan2(m, −m) will compute to 135°, which is again the correct phase.

Since Atan2() computes a phase value that is between 0° and 360° the computed phase will appear to have a discontinuity when in one instance Atan2() evaluates to, say, 359.9° and in the next to 0.1°. The preferred embodiment detects this apparent discontinuity and reports 360.1° instead of 0.1° for the case posited here. This sort of phase "unwrapping" accurately allows multiple cycles of 360° to accumulate and is common in the signal processing art.

In an alternate embodiment, the phase is calculated directly from the results of the same Fourier transform which yielded the fundamental frequency. As is known in the art, the phase of a frequency represented in a Fourier transform is determined by the two values—one termed "real" and the other, "imaginary"—produced by the transform at that frequency. That phase is given by $$P = A\tan2(R, I);$$

where

P is the phase;

R is the real component of the Fourier transform at the frequency of interest; and I is the imaginary component of the Fourier transform at the frequency of interest.

This method of phase computation is analogous to the computations using the scalar products in that the phase is determined through the Atan2() function. It is different from the scalar product method in that it does not involve the direct computation of a reference sine wave or cosine wave. The phase reference in this case is a sine wave that is implicit in the Fourier transform and need not explicitly appear in the computation.

Another method involves a modification of the scalar product method and can produce more precise results. Instead of using one sine and one cosine at the fundamental frequency, it employs two sine/cosine pairs. One pair has a frequency that is slightly lower than the fundamental, and the other, a frequency that is slightly higher. The phase is computed as in the scalar product method using each of these pairs resulting in two phase values that are generally not the same. Since the fundamental frequency lies between the frequencies of the sine/cosine pairs, the phase of the fundamental lies between the two computed phases, and is found by interpolating between those two phases as a function of the frequency. Mathematically, this is expressed as follows:

First $$M_s1 = S1(n) \bullet I(n);$$

$$M_c1 = C1(n) \bullet I(n);$$

$$M_s2 = S2(n) \bullet I(n); \text{ and}$$

$$M_s2 = C2(n) \bullet I(n);$$

then $$P1 = A\tan2(M_c1, M_s1); \text{ and}$$

$$P2 = A\tan2(M_c2, M_s2);$$

and finally, $$P=P1+[(P2-P1)\times((F2-F)/(F2-F1))];$$

where

I(n) is the pixel brightness data from the camera as before;

S1(n) and C1(n) are the computed sine and cosine functions at a frequency slightly less than the fundamental frequency in the pixel brightness data;

S2(n) and C2(n) are the computed sine and cosine functions at a frequency slightly greater than the fundamental frequency in the pixel brightness data;

"●" is the scalar product operator;

$M_s1$ and $M_c1$ are the scalar magnitudes that result from forming the scalar product of S1(n) and C1(n), respectively, with I(n);

$M_s2$ and $M_c2$ are the scalar magnitudes that result from forming the scalar product of S2(n) and C2(n), respectively, with I(n);

Atan2() is the four-quadrant arctangent function;

P1 is the phase of the fundamental frequency contained in I(n), computed relative to a sinusoid with a frequency slightly less than the fundamental;

P2 is the phase of the fundamental frequency contained in I(n), computed relative to a sinusoid with a frequency slightly greater than the fundamental;

P is the phase of the fundamental relative to a sinusoid with a frequency precisely that of the fundamental. This is the needed result of these computations;

F is the frequency of the fundamental contained in the pixel brightness data;

F1 is the frequency of S1 and C1, and is slightly lower than the fundamental frequency; and F2 is the frequency of S2 and C2, and is slightly higher than the fundamental frequency.

In these computations, the last step in which P is calculated is a linear interpolation between P1 and P2 based on F1, F2, and F. Also in this method, the terms "slightly higher" and "slightly lower" indicate variations of 1/N where N is the number of pixels in the brightness data. In the preferred embodiment, N equals 2048.

In block 89, once the phase is determined, it can then be converted directly into a position since the spacing of the rulings on the scale is known, and one cycle of the fundamental frequency (360 degrees of phase) corresponds to one spacing interval of the rulings.

Next, in decision block 90, the control unit checks to see if an object is being tracked. If no object is being tracked, the process ends with the determination of the actual position of the object 30. However, if an object, such as a celestial body, is being tracked, then the desired position to track the object of interest is computed in block 91 and the actual position is compared to the computed value of the desired position in block 92. In the case of the observatory telescope, the desired position is computed as a function of the angular displacement of the base of the telescope needed to keep a star or other celestial body within the field of view of the telescope. Based on the difference between the actual and desired position, in block 93 the control unit sends commands to the mechanical driver 45 (FIG. 3) to correct the displacement of the base, if necessary, to minimize the difference between the actual and desired positions.

The method includes several features that increase its accuracy and shorten the time of computation for real-time tracking of moving objects. In practice, the system need only compute the fundamental frequency of the image once. Even in the case of a moving object which requires real-time tracking and position measurement, the system uses the same computed fundamental to generate the reference sine and cosine signals. Also, the method employed in the system inherently discriminates between image elements that have the same spacing as the rulings and elements that do not; thus, the position encoding process is insensitive to dirt that may entirely obscure a few random rulings.

Another feature of the present invention is its ability to jump the butted ends of two scales. During the process of block 86, if the computer detects a gap in the individual rulings, it processes an interrupt routine at block 87, moves to the side of the gap with more rulings and resumes calculations of the fundamental frequency at block 94 with the proper phase or position offset. The offset is calculated as the difference in phase or position between the two scales. This makes excessively long scales unnecessary when encoding the position of large objects. It is also not necessary that the rulings at the ends of separate scales or the same scale be precisely aligned. In one embodiment, if the gap width is known initially, the system adds the proper offset when the gap is encountered. In an alternate embodiment, if the gap width is not known initially, when the system encounters the gap, the system first computes position using the side of image that has the longest run with respect to the gap. When the gap reaches the center of the image, the system then measures position on both sides of the gap. Since the system knows the position of the object based on the computations from the first side, it then computes the position from the second side and adds whatever offset is necessary to equalize the position measurements on the second side with respect to the measurements from the first side.

The averaging that results in the method also alleviates error as a result of contamination. For example, in the case of the telescope axis encoding system of FIG. 1, the line scan camera 16 images about 50 millimeters of the ruled scale 14. The diameter of the base 12 of the telescope is four meters. The scale is ruled with approximately four lines per millimeter. Thus, an average of approximately 200 individual rulings are taken by each image. Because of the relatively large number of rulings that are taken into account by the averaging function, anomalies and contaminants that obscure individual rulings do not significantly affect the method.

In addition, the position encoding system can be largely constructed with relatively inexpensive components. The pixel brightness representation of the scale, for example, is downloaded to the computer 20 through a customized but relatively low-cost camera interface 18. The computer is a conventional a 486DX2/50 running an ISA-bus machine, contains a DSP32C/50 digital signal processor 22 which performs the bulk of the image analysis and position determination.

The system is also capable of performance on a wide range of velocities. Using the inexpensive components described, the system has been demonstrated to operate at the following velocity and acceleration. The system readily operates on an object having a velocity of 200 mm/s, and an acceleration of 1.2 meters/$s^2$. If faster performance is required, more expensive commercially available computing hardware can be used to increase the processing speed.

The system is also not subject to tight tolerances for satisfactory performance. The fast position determination method uses the entire image in its calculations to determine the fundamental frequency of the image of the ruled scale. The fundamental frequency is computed by the use of a Fourier transform. Since the method is sensitive to the position of the rulings and not to their brightness or contrast, the system is relatively insensitive to contamination that affects reflectivity. Lastly, the method discriminates between image elements that have the same spacing as the rulings and elements that do not. This makes the system insensitive to dirt that may entirely obscure a few random rulings when the image is obtained. In this exemplary embodiment, angular alignment to within ¼ degree is more than adequate for the system to operate satisfactorily. Focus should be within ±0.25 millimeters of a nominal 75 millimeter standoff distance. The easiest way to achieve this is to mount the camera near one of the bearing points that define the axis position. In the exemplary telescope embodiment, the system can dissipate as much as nine watts at the camera head. To prevent any seeing effects (image degradation of the telescope itself), the camera must be thermally isolated from the telescope environment. This can be done with an insulated enclosure and forced ventilation of the camera mounting location.

Figure 5A:
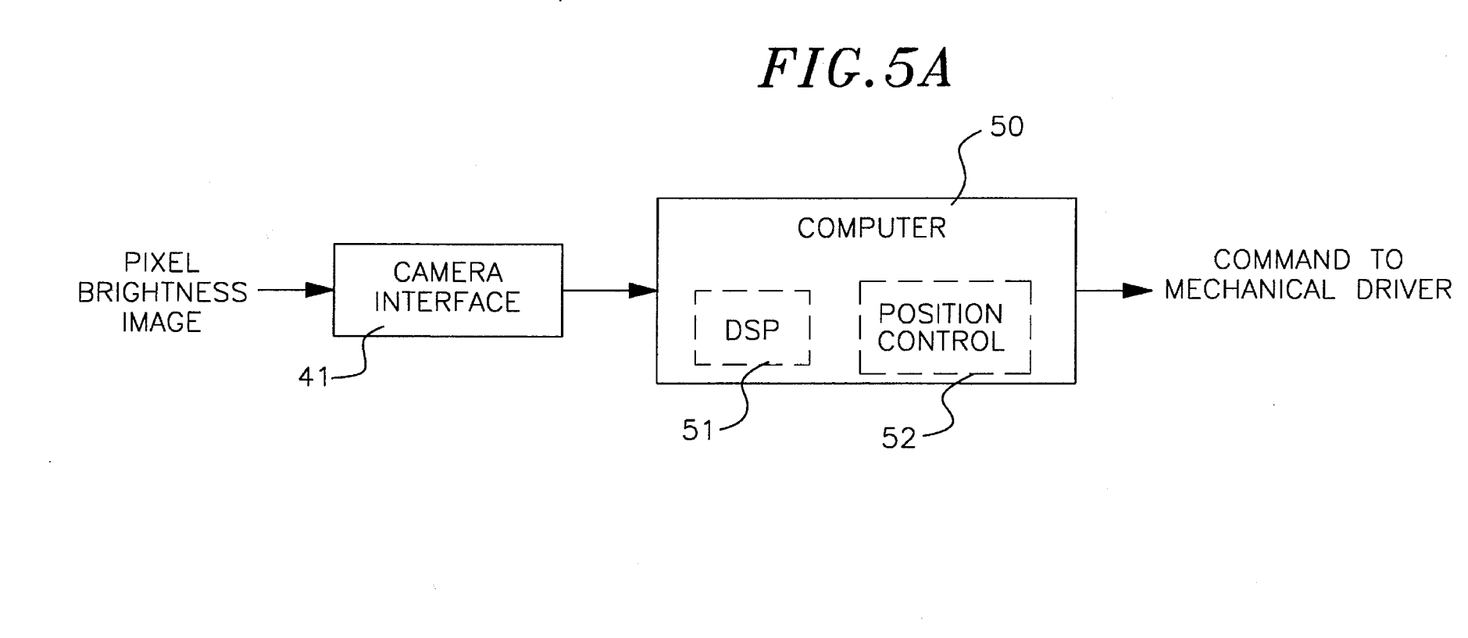
FIG. 5A is a block diagram of a preferred embodiment of the control unit of the position encoding apparatus of FIG. 3.
Figure 5B:
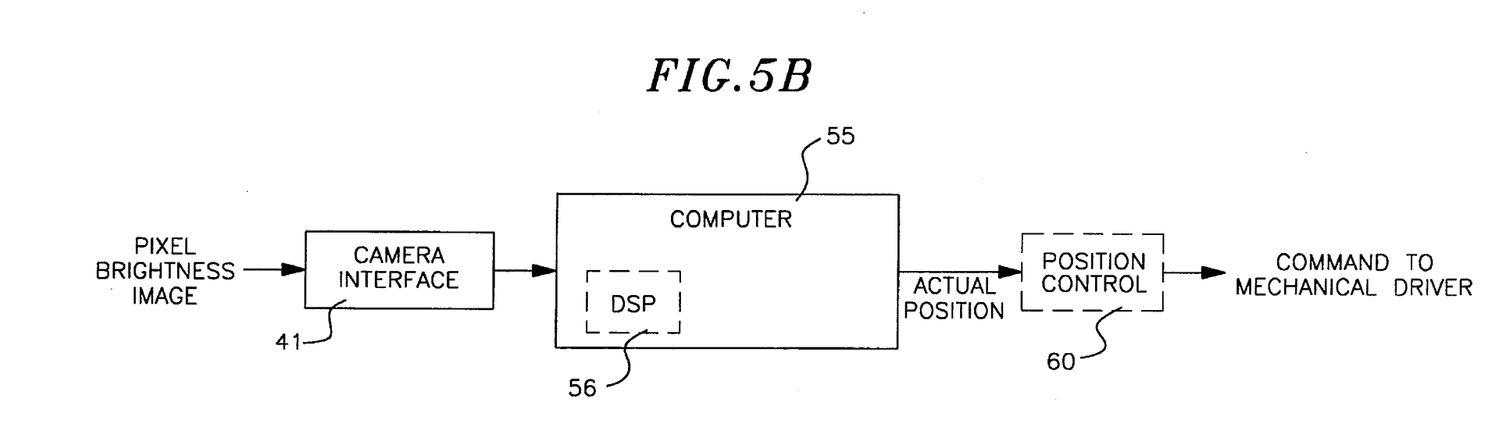
FIG. 5B is a block diagram of an alternate embodiment of the control unit of the position encoding apparatus of FIG. 3.

The relative simplicity of the system allows for variations in the components used. As shown in FIG. 5, the control unit 40 may be implemented in at least two ways. In the first embodiment, shown in FIG. 5A, the control unit 40 is comprised of a computer 50 which includes a digital signal processor 51 and a position control program 52. The pixel brightness image is downloaded through the camera interface to the computer. The computer determines the actual position of the object 30 through the use of a fast position determination method according to the present invention. After determining the actual position of the object that is to be encoded, the computer uses the position control program to determine the desired position. The position control program then outputs commands to the mechanical driver to make the proper adjustments to the position of the object.

In an alternate embodiment of FIG. 5B, the control unit 40 is comprised of a computer 55 and a separate position control unit 60. The pixel brightness image is downloaded through the camera interface to the computer. Through the use of the fast position determination method, the digital signal processor within the computer determines the actual position of the object. This actual position is sent to the position control unit which determines the difference between the actual position and desired position and sends a command to the mechanical driver.

While the invention has been described and illustrated with reference to specific embodiments, those skilled in the art will recognize that modifications and variations may be made without departing from the principles of the invention. For example, the position encoding system may be readily adapted to determine linear position as well as angular position.

What is claimed is:

1. A method for determining position of an object comprising the obtaining a continuous representation of a continuous section of the object, the section having indicia thereon;

determining, from the continuous representation, frequency of changes on the indicia; and determining phase between the determined frequency and a reference to obtain actual position of the object.

2. The method of claim 1 wherein the step of obtaining a representation of the indicia comprises obtaining an image of a ruled scale coupled to the object.

3. The method of claim 2 wherein the step of determining the frequency of changes on the indicia comprises determining fundamental frequency of changes between individual rulings of the ruled scale.

4. The method of claim 1 wherein the step of determining the frequency of changes on the indicia comprises taking the Fourier transform of the changes.

5. The method of claim 1 wherein the step of determining the frequency of changes comprises a function that averages over a plurality of changes on the indicia for about 200 separate indicia.

6. The method of claim 1 further comprising the step of generating a reference signal having a frequency substantially the same as the determined frequency.

7. The method of claim 1 wherein the phase determining step comprises direct use of a Fourier transform.

8. The method of claim 1 wherein the phase determining step comprises generating a plurality of signals each having substantially the same frequency as fundamental frequency of the changes on the indicia.

9. The method of claim 1 wherein the phase determining step comprises generating a plurality of signals having a plurality of frequencies.

10. The method of claim 1 wherein the phase determining step comprises comparing the representation of the indicia to a computed signal.

11. The method of claim 1 further comprising the steps of comparing the actual position to a desired position of the object and correcting the position of the object as a function of the difference between the actual and desired positions.

12. A method for determining the position of an object comprising the steps of:

detecting a continuous representation of a continuous section of a ruled scale coupled to the object;

converting the detected continuous representation to a pixel brightness representation of the continuous section of rulings on the scale;

determining, based on the pixel brightness representation, fundamental frequency of the representation; and determining phase between the fundamental frequency and a reference.

13. The method of claim 12 further comprising the step of determining actual position of the object as a function of the phase difference.

14. The method of claim 13 further comprising the step of comparing the actual position of the object to a desired position of the object.

15. The method of claim 14 further comprising the step of moving the object toward the desired position.

16. The method of claim 12 wherein the detecting step comprises obtaining an image of the ruled scale.

17. The method of claim 12 wherein the converting step comprises using a line scan CCD to obtain a pixel brightness representation of light and dark etches on the ruled scale.

18. The method of claim 12 wherein the step of determining the fundamental frequency comprises taking a Fourier transform.

19. The method of claim 12 wherein the phase determining step comprises generating the reference with a frequency substantially the same as the fundamental frequency.

20. The method of claim 12 wherein the phase difference determining step comprises direct use of a Fourier transform computation.

21. The method of claim 12 wherein the phase determining step comprises generating a plurality of signals each having substantially the same frequency as the fundamental frequency of the representation.

22. The method of claim 12 wherein the phase determining step comprises generating a plurality of signals having a plurality of frequencies.

23. The method of claim 12 wherein the step of determining the frequency further comprises the steps of:

analyzing the representation of the ruled scale to detect whether a gap exists in individual rulings of the ruled scale;

moving to side of the gap of the ruled scale; and resuming calculation with a proper offset corresponding to any phase difference caused by the gap in the ruled scale.

24. The method of claim 12 wherein the step of determining phase between the fundamental frequency and the reference comprises obtaining a phase difference between the fundamental frequency and the reference and determining the actual position of the object as a function of the phase difference.

25. A position encoder system for determining the position of an object comprising:

indicia on the object;

detecting means for obtaining a continuous representation of a continuous section of the indicia;

determining means coupled to the detecting means for determining the fundamental frequency of the continuous representation;

comparing means for comparing the fundamental frequency to a reference; and means for determining the actual position of the object as a function of output of the comparing means.

26. The position encoder system of claim 25 further comprising means for determining the desired position of the object as a function of output of the comparing means.

27. The position encoder system of claim 25 wherein the object is the base of an observatory telescope.

28. The position encoder system of claim 25 wherein the detecting means comprises a video camera.

29. A position encoding system for determining the position of an object, comprising:

a ruled scale coupled to an object;

means for obtaining the image of a continuous section of the ruled scale; and means for determining a frequency of the image and determining phase between the frequency and a reference to obtain an actual position of the object.

30. The system of claim 29 wherein the means for obtaining the image of the ruled scale comprises a camera which downloads the image of the scale to a digital computation means.

31. The system of claim 29 wherein the means for obtaining the image of the ruled scale comprises a camera and line scan array for constructing a pixel brightness representation of the image of the ruled scale.

32. The system of claim 29 further comprising means for comparing the actual position to a desired position of the object and correcting the position of the object as a function of the difference between the actual position and desired position.

33. A method for determining the position of an object comprising the steps of:

detecting a representation of a ruled scale coupled to the object;

converting the detected representation to a pixel brightness representation of rulings on the scale;

determining fundamental frequency of the representation; and determining phase between the fundamental frequency and a reference, wherein the step of determining the frequency further comprises the steps of:

analyzing the representation of the ruled scale to detect whether a gap exists in individual rulings of the ruled scale;

moving to a side of the gap of the ruled scale; and resuming calculation with a proper offset corresponding to any phase difference caused by the gap in the ruled scale.

* * * * *